July 19, 1949.   G. T. BRADY   2,476,943
ELECTRICAL APPARATUS FOR MEASURING METAL THICKNESSES
Filed June 9, 1948
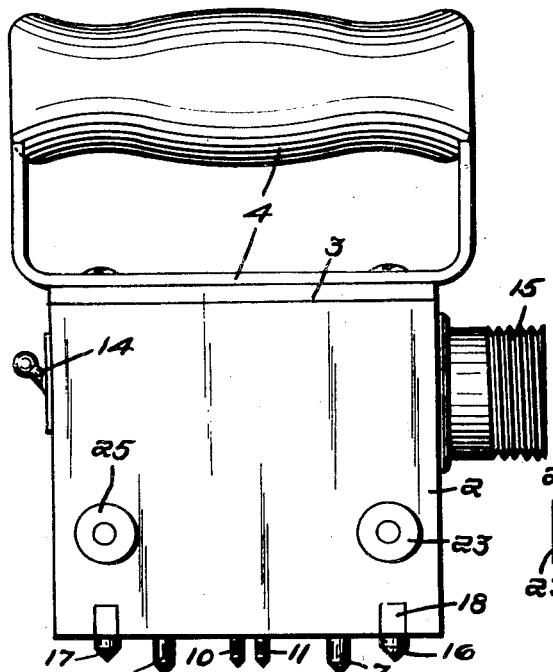
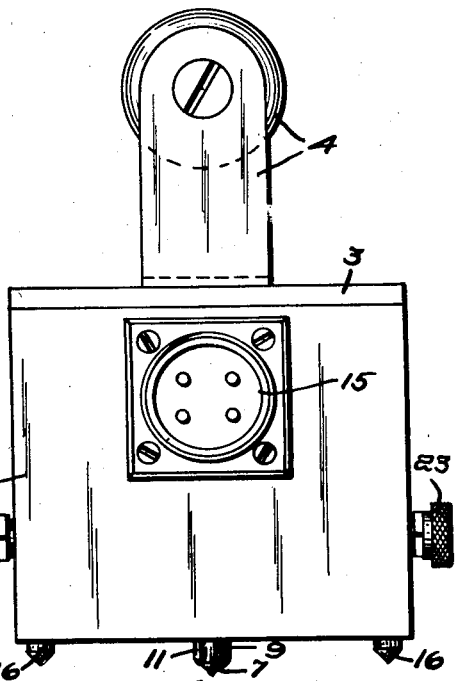
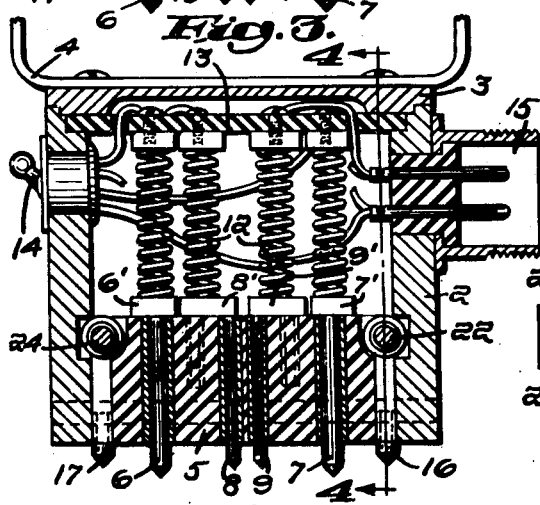
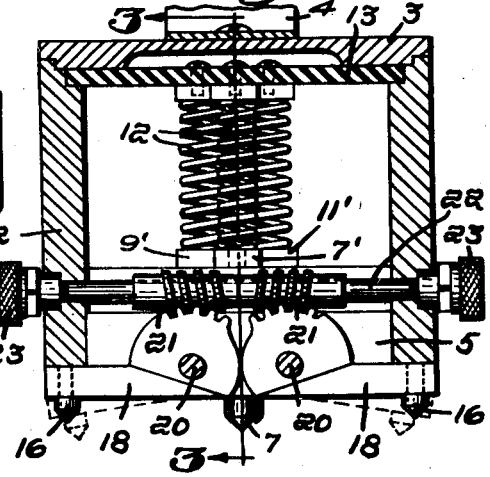
Inventor:
George T. Brady,
by J. H. McCurdy
Attorney.

Patented July 19, 1949

2,476,943

UNITED STATES PATENT OFFICE 2,476,943

ELECTRICAL APPARATUS FOR MEASURING METAL THICKNESSES

George T. Brady, Waltham, Mass., assignor to Branson Instruments, Inc., Stamford, Conn., a corporation of Connecticut Application June 9, 1948, Serial No. 32,013

5 Claims. (Cl. 175—183)

This invention relates to the contact devices or "probes" used in apparatus for electrically measuring the thickness of metal structures, such as piping, boilers, tanks, and the like.

Several forms of apparatus are available on the market for making thickness measurements in this manner. In all of those with which I am familiar the operating principle is based on electrical conductivity. The usual procedure is to cause current to flow through an area at and adjacent to the surface of the article under examination between two electrodes. This procedure is then repeated with a second pair of electrodes spaced apart by a considerably greater distance, the same amperage being used in both tests. The potential drop created between two fixed points in this area is measured in both cases through additional electrodes. The ratio between the two potential readings obtained from these tests is a function of metal thickness at the area tested. Check readings also usually are taken with the currents flowing in opposite directions. With the data so ascertained the thickness of the metal can be determined by charts or computations, well known to those skilled in this art.

The accuracy of the results so obtained depends very largely on making a good contact between each electrode and the work piece being operated upon. For this reason it is customary to clean the surface carefully against which the probe will be pressed, and if it is corroded, which often is the case, then it will be ground so that a bright, clean, metallic surface will be obtained upon which to make the test.

The present invention aims to improve the construction of the probes used for this purpose with a view to reducing their bulk and weight, making them more convenient to use, and providing a construction in which accuracy of results will be facilitated.

The nature of the invention will be readily understood from the following description when read in connection with the accompanying drawings, and the novel features will be particularly pointed out in the appended claims.

In the drawings,

Fig. 1 is a side elevation of a probe constructed in accordance with this invention;

Fig. 2 is a right-hand end view of the device shown in Fig. 1;

Fig. 3 is a vertical, sectional view longitudinally of the instrument shown in Figs. 1 and 2, the plane of section being indicated by the line 3—3, Fig. 4;

Fig. 4 is a sectional view taken on the line 4—4, Fig. 3; and

Fig. 5 is a diagrammatic view of the circuit used in the instrument.

The construction shown in the drawings comprises a support or holder including a hollow casing 2 of approximately rectangular form and provided with a top plate 3 to which a handle 4 is secured. The bottom of this casing includes a thick plate or block 5 of insulation, and mounted in this block are two sets of contacts or electrodes, one set comprising simply two electrodes 6 and 7, while the other set consists of a group of four closely spaced, smaller electrodes 8, 9, 10 and 11, arranged in the manner indicated in Fig. 5.

As best shown in Fig. 3, each electrode consists of a plunger guided in a metal tube set into the insulating body 5. At its upper end each electrode carries a metal piece block or cap which rests on the upper surface of the insulating plate 5, and a series of springs 12 bear on the respective blocks, the upper ends of these springs being backed up by additional metal blocks which are secured to the lower face of another insulating plate 13 by screws.

These springs, blocks and screws serve not only to hold the electrode points normally projected below the bottom surface of the holder, but also as conductors to carry current to and from them. The circuit in which they are connected is indicated diagrammatically in Fig. 5, and it includes a switch 14, Figs. 3 and 5, and one member of an electrical coupling or connector of a common form, indicated in general at 15. It is adapted to cooperate with another member to connect the circuit shown in Fig. 5 into an outside circuit. Of the terminals in this connector the two inner ones, shown in Fig. 5 at A, are current input terminals while the outside terminals B are intended to be connected with the input side of an electronic amplifying apparatus which increases the voltage picked up at the terminals 10 and 11. The switch 14 can connect the supply circuit with either the two outside electrodes 6 and 7 or with the inside electrodes 8 and 9, as may be desired, and the electrodes 10 and 11 simply serve to pick off the voltage difference created in the work piece by the flow of current between the points 8 and 9, whether this current flow takes place between the inner electrodes or the outer pair 6 and 7.

It should be observed, however, that this electrode assembly is novel in being symmetrical with reference to the line 6—7 which is the center line of that assembly. Also, as will be seen from an inspection of Fig. 4, the line 6—7 is in the median plane of this electrode assembly, and it is the vertical plane indicated by the section line 3—3, Fig. 4. It divides the central electrode group into two pairs located on opposite sides of it, so that the entire electrode assembly has a width equal only to that of the central group, usually about three-sixteenths of an inch, and a length equal to that of the line 6—7 which may not be over an inch and a half.

This compactness is an important advantage in preparing the surface of a pipe, boiler, or the like, for testing because it requires the cleaning or grinding of only a very narrow strip of surface and thus materially reduces the time and labor necessary in performing that operation.

In using this device it is pressed hard against the surface which has been prepared for it and the electrodes are pushed backwardly before they become firmly seated on the test surface. Preferably the outer electroes 6 and 7 project somewhat further than the inner electrodes, which is an advantage in operating on curved surfaces. The test current will flow through the metal between the outside electrodes 6 and 7 or between the inside electrodes 8 and 9, depending on the position of the switch 14. In either case the potential drop will be picked off by the electrodes 10 and 11.

It is important to have the instrument presented squarely or at right angles to the surface prepared for test purposes, and an important feature of this invention resides in the arrangement for supporting the holder in that position. For this purpose the device is equipped with four pins, one pair shown at 16—16 at one end of the holder and another pair 17—17 at the opposite end. They are located approximately at the four corners of the holder. Referring more particularly to Figs. 1, 3 and 4, it will be seen that the two pins 16—16 are mounted on the outer ends of two levers 18—18 fulcrumed at 20—20, and that these levers include gear segments which mesh, respectively, with worms 21—21, both rigid with a shaft 22 extending transversely through the holder casing and equipped outside of it with knobs 23—23. Consequently, by turning either knob 23 the shaft 22 may be revolved in a direction to swing both pins 16—16 in unison and at the same rate, downwardly and inwardly toward each other, both swinging about axes which are positioned closely adjacent to the median plane of the electrode assembly. The other electrodes 17—17 are similarly mounted and are operated by a worm shaft 24, Fig. 3, equipped with knobs, one of which is shown at 25. Both shatfs are held against endwise movement.

The four pins 16 and 17 lie at the corners of a rectangle within which the electrode assembly is located, and such an arrangement is of great assistance in properly positioning the probe on a cylindrical surface, such as a pipe, or on either a flat or curved surface. It enables the operator to properly adjust the positions of the pins by trial, preparatory to taking his test readings, so that all six of the electrodes will make firm contact with the prepared surface during the testing operations. When not in use all the levers carrying the pins can be withdrawn within the holder, as will be evident from Figs. 1 and 2.

Thus the invention provides a probe with which the liability of making errors in results are materially reduced, which can be manufactured more economically, and which is far more convenient to use than the prior art constructions.

While I have herein shown and described a preferred embodiment of my invention, it will be evident that the invention may be embodied in other forms without departing from the spirit or scope thereof.

Having thus described my invention, what I desire to claim as new is:

1. A probe of the character described, comprising two sets of electrodes, a holder on which said electrodes are mounted for simultaneous engagement with a surface to be examined, means for supporting said holder in proper position on said surface, comprising four pins arranged in two pairs and positioned in the corners of a rectangle within which said electrodes are located, and means connecting the individuals of each pair of pins for simultaneous adjustment.

2. A probe of the character described, comprising two sets of electrodes, a holder on which said electrodes are mounted for simultaneous engagement with a surface to be examined, means for supporting said holder in proper position on said surface, comprising four pins arranged in two pairs and positioned in the corners of a rectangle within which said electrodes are located, and means connecting the individuals of each pair of pins to each other, including parts geared together and operable to project both pins simultaneously and at the same rate.

3. A probe according to preceding claim 2, in which said parts geared together are connected to each other through an actuating worm.

4. A probe of the character described, comprising two sets of electrodes, a holder on which said electrodes are mounted for simultaneous engagement with a surface to be examined, means for supporting said holder in proper position on said surface, comprising four pins arranged in two pairs and positioned in the corners of a rectangle within which said electrodes are located, said electrodes being symmetrically arranged with reference to a median plane, and operating mechanism for swinging both individuals of either pair of pins simultaneously downwardly and inwardly toward each other about an area positioned closely adjacent to the median plane of said electrode assembly.

5. A probe according to preceding claim 1, in which the supporting means for each pair of pins comprises two levers on which the respective pins are positioned, gear elements connected with said respective levers and meshing with each other, and means meshing with said elements and operable to actuate them in unison.

GEORGE T. BRADY.

REFERENCES CITED

The following references are of record in the file of this patent:

UNITED STATES PATENTS

| Number | Name | Date |
|---|---|---|
| 2,094,234 | Drain | Sept. 28, 1937 |
| 2,195,504 | Stone | Apr. 2, 1940 |
| 2,440,044 | Greenslade | Apr. 20, 1948 |